US009670990B2

(12) United States Patent
Moosmann et al.

(10) Patent No.: US 9,670,990 B2
(45) Date of Patent: Jun. 6, 2017

(54) MOTOR VEHICLE DRIVE TRAIN AND METHOD OF OPERATING A DRIVE TRAIN

(71) Applicant: GETRAG Getriebe- und Zahnradfabrik Hermann Hagenmeyer GmbH & Cie KG, Untergruppenbach (DE)

(72) Inventors: Hans-Peter Moosmann, Untergruppenbach (DE); Klaus-Dieter Wolf, Untergruppenbach (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 671 days.

(21) Appl. No.: 14/177,971

(22) Filed: Feb. 11, 2014

(65) Prior Publication Data

US 2014/0190309 A1   Jul. 10, 2014

Related U.S. Application Data

(63) Continuation of application No. PCT/EP2012/067811, filed on Sep. 12, 2012.

(30) Foreign Application Priority Data

Sep. 12, 2011  (DE) .................. 10 2011 113 288

(51) Int. Cl.
*F16H 3/00* (2006.01)
*B60K 6/00* (2006.01)
(Continued)

(52) U.S. Cl.
CPC .............. *F16H 3/00* (2013.01); *B60K 6/387* (2013.01); *B60K 6/442* (2013.01); *B60K 6/48* (2013.01);
(Continued)

(58) Field of Classification Search
CPC ........ F16H 3/006; F16H 37/065; F16H 48/19; B60K 6/387; B60K 6/442; B60K 6/48; B60K 6/547; B60K 17/02
(Continued)

(56) References Cited

U.S. PATENT DOCUMENTS 2,351,234 A * 6/1944 Schon ................ B60K 5/08
180/69.6
6,854,359 B1 * 2/2005 Ma ..................... B60K 17/36
475/203
(Continued)

FOREIGN PATENT DOCUMENTS

CN    101688601 A    3/2010
DE    39 00 638 C2   7/1989
(Continued)

OTHER PUBLICATIONS

International Preliminary Report on Patentability in Application No. PCT/EP2012/067811, dated Mar. 12, 2014 in 7 pages.
(Continued)

*Primary Examiner* — William C Joyce
(74) *Attorney, Agent, or Firm* — Knobbe Martens Olson & Bear LLP

(57) ABSTRACT

A drive train for a motor vehicle, having a drive unit which comprises a prime mover, a multi-step transmission and a power-splitting device which distributes the driving power between a first and a second drive shaft of a driven axle. The transmission comprises a transmission input and a first sub-transmission and a second sub-transmission. The prime mover is directly connected to the transmission input, wherein each of the two drive shafts is assigned a first and a second friction clutch. The first friction clutches connect the respective drive shaft to the first sub-transmission. The second friction clutches connect the respective drive shaft to
(Continued)

the second sub-transmission. The first friction clutches and the second friction clutches form the power-splitting device.

19 Claims, 3 Drawing Sheets

(51) Int. Cl.
  *B60K 6/387* (2007.10)
  *B60K 17/02* (2006.01)
  *B60K 6/442* (2007.10)
  *B60K 6/48* (2007.10)
  *B60K 6/547* (2007.10)
  *F16H 37/06* (2006.01)
  *F16H 48/19* (2012.01)

(52) U.S. Cl.
  CPC .............. *B60K 6/547* (2013.01); *B60K 17/02* (2013.01); *F16H 3/006* (2013.01); *F16H 37/065* (2013.01); *B60K 2006/4808* (2013.01); *F16H 48/19* (2013.01); *F16H 2200/0052* (2013.01); *Y02T 10/626* (2013.01); *Y02T 10/6221* (2013.01); *Y02T 10/6234* (2013.01); *Y10T 74/19074* (2015.01)

(58) Field of Classification Search
  USPC ............................................ 74/650, 665 GA
  See application file for complete search history.

(56) References Cited

U.S. PATENT DOCUMENTS

| 2004/0159182 | A1* | 8/2004 | Cippitelli ............... B62D 11/10 74/650 |
| 2008/0029328 | A1 | 2/2008 | Hoeck et al. |
| 2008/0035405 | A1* | 2/2008 | Oberhausen ........... B60K 17/16 180/245 |
| 2010/0099536 | A1 | 4/2010 | Vennemann |
| 2011/0290073 | A1* | 12/2011 | Mellet ..................... F16H 3/006 74/665 K |
| 2011/0306456 | A1* | 12/2011 | Mellet ..................... F16H 3/006 475/198 |
| 2012/0174703 | A1* | 7/2012 | Ross ....................... F16H 3/006 74/650 |

FOREIGN PATENT DOCUMENTS

| DE | 199 17 724 A1 | 11/2000 |
| DE | 103 05 639 A1 | 3/2004 |
| DE | 10 2004 046 008 A1 | 3/2006 |
| DE | 10 2007 030091 A1 | 10/2008 |
| EP | 2 019 229 A2 | 1/2009 |
| WO | WO 2006/029684 A1 | 3/2006 |

OTHER PUBLICATIONS

Nov. 23, 2012 International Search Report for Application No. PCT/EP2012/067811 filed on Sep. 12, 2012.

\* cited by examiner

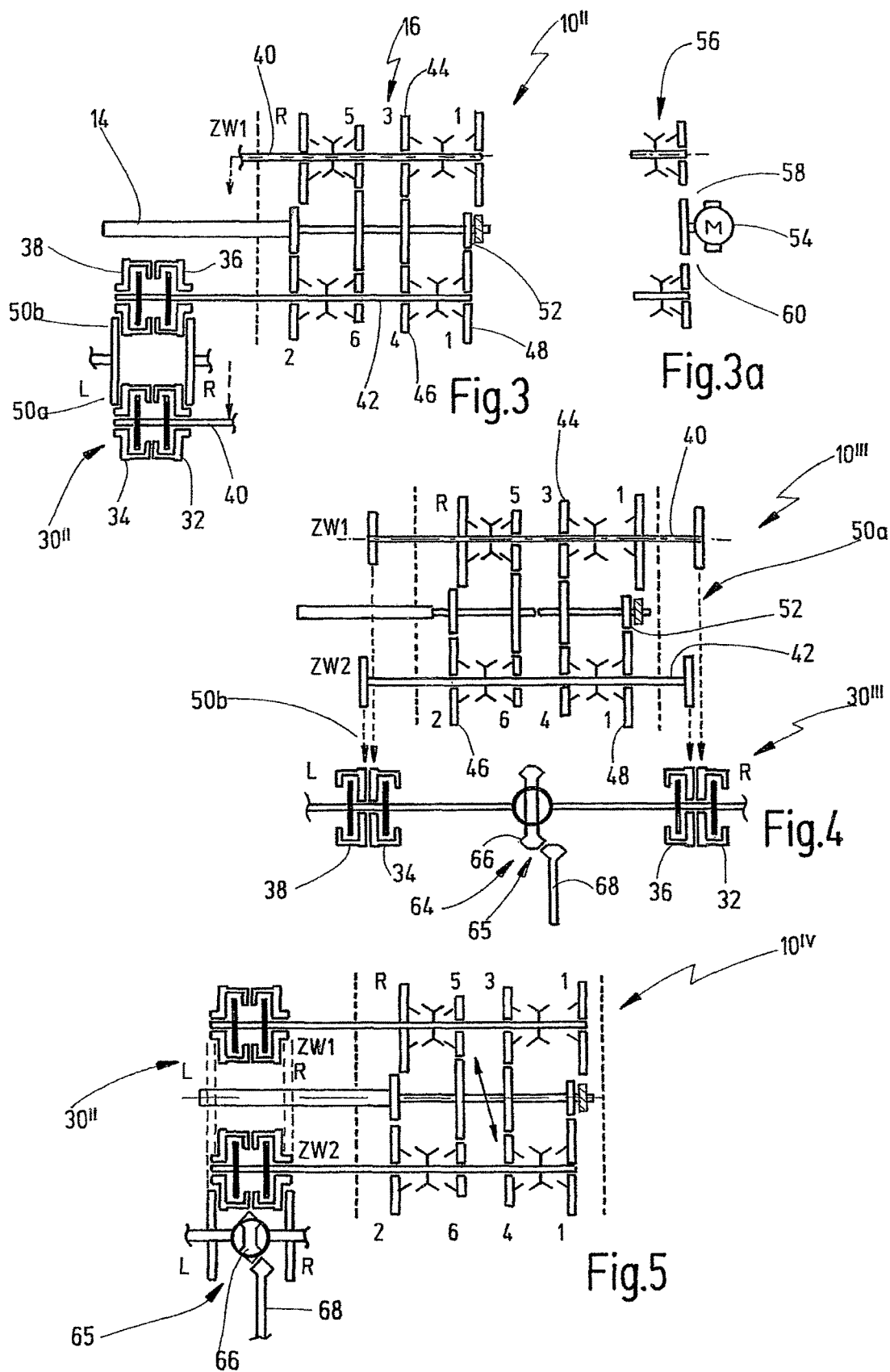

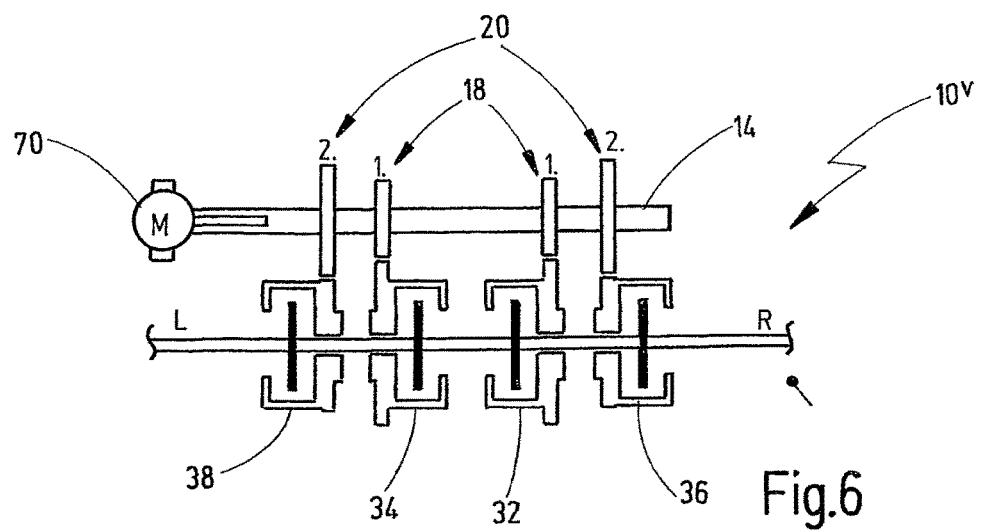
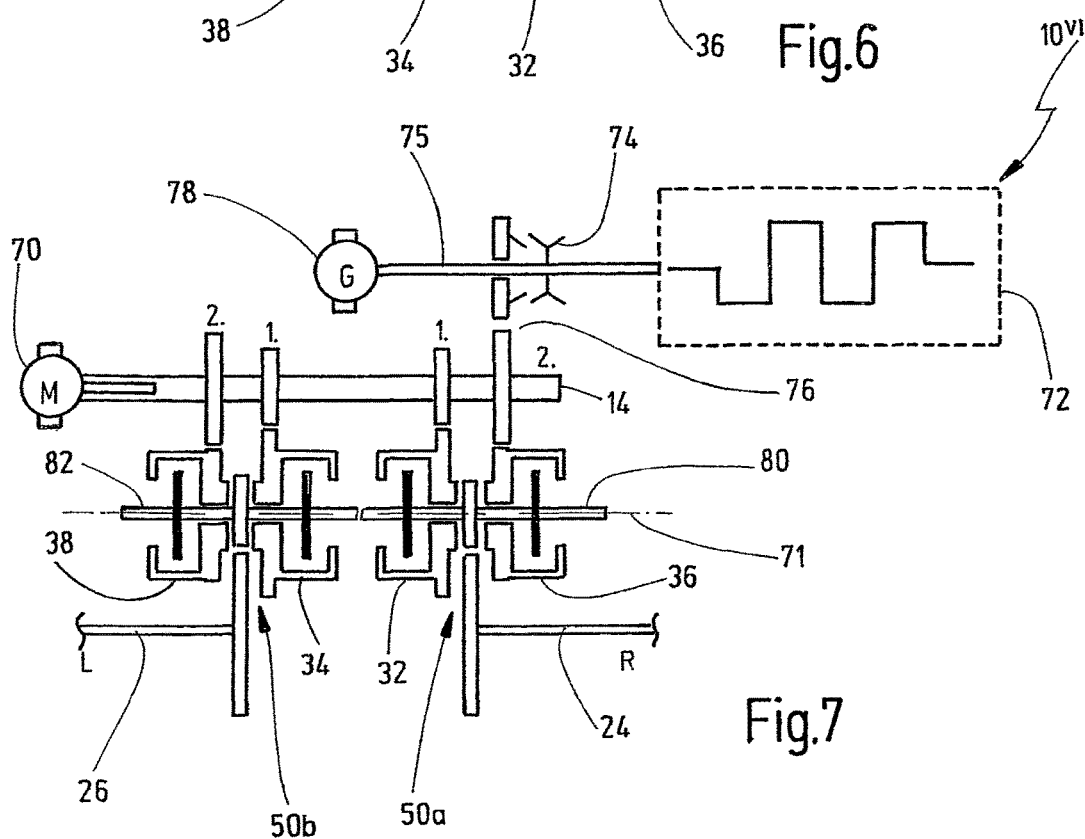

MOTOR VEHICLE DRIVE TRAIN AND METHOD OF OPERATING A DRIVE TRAIN

CROSS-REFERENCE OF RELATED APPLICATIONS

This is a Continuation application of International patent application PCT/EP 2012/067811, filed Sep. 12, 2012, which claims the priority of German patent application DE 10 2011 113 288, filed Sep. 12, 2011.

BACKGROUND OF THE INVENTION

The present invention relates to a drive train for a motor vehicle, having a drive unit which comprises a prime mover, a multi-step transmission which comprises a transmission input and a first sub-transmission as well as a second sub-transmission, and having a power-splitting device which distributes the driving power between a first and a second drive shaft of a driven axle.

A drive train of this kind is generally known in the form of a so-called du-al-clutch transmission, for example. In this kind of drive train the prime mover is connected to the multi-step transmission via a dual-clutch arrangement, as is disclosed in document DE 103 05 639 A1, for example. An output of the multi-step transmission is connected to a power-splitting device in the form of a mechanical differential.

In this kind of drive train the transmission input is formed by two shafts concentric to one another, which are connected to the respective sub-transmissions. The mechanical differential does not allow any torque vectoring, in other words a differing distribution of torques to the driven wheels on the driven axle.

An idea of this kind is disclosed in the document DE 39 00 638 C2. In this case, an output from a multi-step transmission is connected to a mechanical differential and also to the drive shafts via transmission ratios and friction clutches that can be independently activated for the two drive shafts. By activating one of the friction clutches while cornering, the outside wheel may be driven at a higher speed, in order to achieve the torque vectoring effect.

In addition, a drive train is disclosed in document DE 10 2004 046 008 A1, in which a power-splitting device of a driven axle comprises two friction clutches instead of a mechanical differential, said friction clutches being activatable independently of one another. With a drive train of this kind, the driven wheels of a driven axle may be exposed to different torques, in order to achieve torque vectoring. An increase in the speed of the outside wheel is only conceivable in the case of a four-wheel drive train, however, in which this kind of dual-clutch differential is configured as a hang-on clutch, which can be shifted via a higher ratio than the other driven axle in the power flow.

The aforementioned drive trains are particularly used in conjunction with prime movers in the form of internal combustion engines. In this case, it is known for traditional drive trains to be additionally equipped with one or a plurality of electric motors, in order to set up a hybrid drive train.

In addition, a drive train is disclosed in document DE 199 17 724 A1, which is designed to be driven solely by an electric motor. The drive train comprises a multi-step transmission with two ratios, wherein the ratios are formed by wheel sets. The loose wheels of these wheel sets can be connected via friction clutches in the power flow, so that gear changes can be performed under load without any loss of tractive force. The output of the multi-step transmission is directly connected to a mechanical differential, which traditionally distributes the driving power between the two drive shafts.

BRIEF SUMMARY OF THE INVENTION

Against this background a problem addressed by the present invention is that of specifying an improved drive train and also an improved method of operating a drive train.

The above problem is on the one hand solved by a drive train of the kind mentioned above, wherein the prime mover is directly connected to the transmission input, wherein each of the two drive shafts is assigned a first and a second friction clutch, wherein the first friction clutches connect the respective drive shaft to the first sub-transmission and wherein the second friction clutches connect the respective drive shaft to the second sub-transmission, such that the first friction clutches and the second friction clutches form the power-splitting device.

The above problem is further solved by a method of operating a drive train, particularly a drive train of the aforementioned kind, wherein the drive train comprises a drive unit and a transmission having a first and a second sub-transmission, wherein a first friction clutch is assigned to the first sub-transmission and wherein a second friction clutch is assigned to the second sub-transmission, wherein both sub-transmissions comprise a starting gear ratio with the same transmission ratio, wherein starting is achieved by simultaneously engaging the first and the second friction clutch.

Finally, the above problem is solved by a method of operating a drive train, particularly a drive train of the aforementioned kind, wherein the drive train comprises a drive unit, a transmission having a first and a second sub-transmission and also a driven axle having a first drive shaft and a second drive shaft, wherein a first and a second friction clutch are assigned to each of the two drive shafts, wherein the first friction clutches connect the respective drive shaft to the first sub-transmission and wherein the second friction clutches connect the respective drive shaft to the second sub-transmission, with the step of connecting the one drive shaft via the first friction clutch and the first sub-transmission to the drive unit and connecting the other drive shaft via the second friction clutch and the second sub-transmission to the drive unit when cornering.

In the drive train according to the invention, no separating clutch arrangement is provided in particular between the prime mover and the transmission input. Instead, the prime mover and the transmission input are connected directly or in a rotationally fixed manner to one another. Where appropriate, this connection may contain a dual mass flywheel, which is regarded in the present case as a direct or rotationally fixed connection.

Instead, the output of the two sub-transmissions is connected to a clutch arrangement, namely such that the output of the first sub-transmission can be connected via a first friction clutch to the first drive shaft or via a further first friction clutch to the second drive shaft. In addition, the output of the second sub-transmission can be connected via a second friction clutch to the first drive shaft and the output of the second sub-transmission can be connected via a further second friction clutch to the second drive shaft.

The clutch arrangement therefore includes four friction clutches. The friction clutches are each configured as power shifting clutches in this case and may be disengaged or engaged in each case. In addition, the friction clutches may preferably each be activated such that they transmit a given torque, in other words, are also operated in a slipping manner.

Gear changes between the first sub-transmission and the second sub-transmission can therefore take place under load, wherein the first friction clutches and the second friction clutches are operated in the manner of a dual-clutch transmission. If, for example, a gear change is to be carried out from a source gear of the first sub-transmission to a target gear of the second sub-transmission, the first friction clutches are disengaged and the second friction clutches are engaged in a manner overlapping therewith, so that the gear change can be performed without any loss of tractive force.

If during driving, when for example a gear ratio in the first sub-transmission is shifted, the first two friction clutches are completely engaged, the clutch mechanism acts as a differential lock, such that the torques supplied to the drive shafts are identical in each case. On μ-split roads, starting can thereby take place as if a mechanical differential were locked.

In addition, during this kind of driving the first two friction clutches are activated independently of one another, such that, for example, a higher torque is assigned to the outside wheel than to the inside wheel during cornering. In this way, a first kind of torque vectoring function can be achieved.

Because the clutch arrangement described above enables each drive shaft to connect independently to the first or the second sub-transmission, a second kind of torque vectoring operation is also possible, in which the one drive shaft is driven via the one sub-transmission and the other drive shaft via the other sub-transmission. In this way, different gear ratios can be set up for the two driven wheels, so that torque vectoring can be achieved with excessive speed increase on the outside wheel.

The problem is therefore entirely solved.

It is particularly advantageous when the prime mover comprises an internal combustion engine, is particularly configured as an internal combustion engine.

In this embodiment, the multi-step transmission may comprise a plurality of four, five, six, seven or more gear ratios.

The internal combustion engine with its crank shaft is directly connected in this case to the transmission input, where appropriate via a dual mass flywheel for vibration damping.

According to a further preferred embodiment, the first sub-transmission comprises a first intermediate shaft, wherein gear ratios of the first sub-transmission are formed by wheel sets, which connect a transmission input shaft to the first intermediate shaft, and/or wherein the second sub-transmission comprises a second intermediate shaft, wherein gear ratios of the second sub-transmission are formed by wheel sets, which connect the transmission input shaft to the second intermediate shaft.

In this embodiment the first intermediate shaft may be configured as the output shaft of the first sub-transmission. The second intermediate shaft may be configured as the output shaft of the second sub-transmission.

The two intermediate shafts are preferably aligned parallel to the transmission input shaft.

In this embodiment, the basic design of the multi-step transmission may be similar to the case of a dual-clutch transmission, wherein, however, a single transmission input shaft is provided as the transmission input shaft, which forms an input shaft for both the first and also for the second sub-transmission.

The wheel sets in this case may be shiftable in a manner known per se, particularly by shifting clutches such as synchronous self-shifting clutches or lock-type synchronous self-shifting clutches. The shifting clutches may be combined into shifting clutch packages for adjacent wheel sets, as is likewise basically known in the state of the art.

The shifting clutches in this case are preferably arranged on the intermediate shafts, although they may also be arranged on the transmission input shaft, where appropriate.

It is further preferable for the first friction clutches to be arranged coaxially to a shaft of the first sub-transmission and/or for the second friction clutches to be arranged coaxially to a shaft of the second sub-transmission.

In this embodiment the respective shafts of the sub-transmissions are preferably each connected to input members of the respective friction clutches.

Output members of the friction clutches in this case are preferably connected to the drive shafts via the respective transmission ratios (single-ratio or multi-ratio).

In accordance with a further overall preferred embodiment, the drive unit comprises an electric motor for supplying driving power, which can be connected to at least one of the sub-transmissions by means of a shifting clutch arrangement.

In this embodiment the drive train is configured as a hybrid drive train. The electric motor can preferably be connected to the outputs of the sub-transmissions by means of the shifting clutch arrangement. In this case it is possible for the electric motor to be used under load for torque support during gear changes. In addition, in a hybrid drive train of this kind, the customary number of functionalities of a drive train of this kind can be achieved, such as boost driving mode, recovery, pure electric driving, etc.

In an alternative embodiment, the prime mover comprises an electric motor or is particularly configured as an electric motor.

The electric motor is directly connected to the transmission input in this case. A drive train of this kind is particularly suitable for pure electric vehicles and also for hybrid vehicles, in which the drive train is configured as a range extender.

It is particularly advantageous in this case for the first sub-transmission to comprise a single first gear ratio and/or for the second sub-transmission to comprise a single second gear ratio.

It has proved preferable in the case of pure electric vehicles and also range extender drive trains for the driving power of the electric motor and, where appropriate, that of the part-time internal combustion engine to be capable of being transmitted to the driven axle via two gear ratios. The first gear ratio in this case is preferably configured as a starting gear ratio for slow speeds and the second gear ratio is sized for speeds up to the maximum vehicle speed. A dual-ratio transmission of this kind is sufficient for purely electric vehicles, due to the characteristics of electric motors.

According to a particularly preferred embodiment, the multi-step transmission in this case comprises a single transmission input shaft, on which two fixed wheels for the first gear ratio are fixed, which fixed wheels engage with loose wheels. The loose wheels can be shifted by means of the first friction clutches in the power flow. Two further fixed wheels for the second gear ratio are fixed to the single transmission input shaft, said further fixed wheels engaging with further loose wheels, which can be shifted by means of the second friction clutches in the power flow. It is possible here to distribute the driving power between the two drive shafts.

In this embodiment, the first friction clutches form a dual-clutch differential for gear ratio 1. The second friction clutches form a dual-clutch differential for gear ratio 2. In addition, it is also possible with this embodiment for torque vectoring of the second kind to be set up, in that the left drive shaft is supplied with power via the first gear ratio, for example, and the right drive shaft via the second gear ratio.

As mentioned above, it is possible for a drive train of this kind to be configured as a range extender drive train. It is preferable in this case for the drive unit to comprise an internal combustion engine, which can be connected to the transmission input by means of a shifting clutch arrangement.

The internal combustion engine in this case is preferably connected to a generator, which converts the driving power of the internal combustion engine into electrical energy, which is then in turn supplied to the electrical prime mover, which is connected to the transmission input. In one operating mode, it is preferably possible, however, to connect the internal combustion engine straight to the transmission input by means of the shifting clutch arrangement, wherein only two gear ratios are then of course available for the internal combustion engine drive.

In the case of lengthy motorway journeys, for example, and where there is a suitable higher gear ratio transmission, it may be advantageous here for the vehicle to be driven solely by the internal combustion engine. Torque vectoring and also a differential lock function can be set up in this case too, by means of the clutch arrangement according to the invention.

As explained above, it is preferable for the transmission input to exhibit a single transmission input shaft.

This leads to substantial savings compared with traditional dual-clutch transmissions, as expensive hollow shaft arrangements for the transmission input are provided in the latter case.

It is likewise preferable overall for both sub-transmissions to comprise a starting gear ratio with the same transmission ratio, such that starting can take place by means of the first two and by means of the second two friction clutches.

As a general rule, the replacement of dual clutches on the transmission input side with clutches at the transmission output means that the friction clutches have to transmit higher torques (transmitted via the gear ratios of the transmission). This may be particularly detrimental in the case of the lower gear ratios or a starting gear ratio. Nevertheless, so that the friction clutches do not have to be individually designed for the maximum load in each case, which results from transmission ratios of this kind, it is provided according to the invention for the same starting gear ratio (with the same transmission) to be assigned to each of the sub-transmissions, so that starting can take place by activating all four clutches simultaneously, so that the torque to be transmitted is distributed between all four clutches.

In the method according to the invention, which is assigned to this embodiment, it is also conceivable for a layout of this kind to be provided in the case of a traditional dual-clutch transmission too, which comprises friction clutches at the input end. It is also possible in this case for the same starting gear ratio to be assigned to each of the two sub-transmissions of a traditional dual-clutch transmission of this kind. Here too, a considerable reduction in the maximum load of the clutches is achieved, since both clutches are activated for starting and the resulting torque is distributed to this extent between the two clutches.

In addition, it is advantageous overall if the first and second friction clutch of the first and/or second drive shaft are arranged coaxially to the first and/or second drive shaft.

In this embodiment, the clutch arrangement according to the invention having four clutches may be arranged coaxially to the driven axle, so that a high saving on installation space results.

In addition, it is advantageous overall for the first and/or second friction clutches to be configured as starting clutches.

As explained above, it is preferable for all friction clutches to be configured as starting clutches. It is also possible, however, for only the first friction clutches assigned to the first sub-transmission (to which the starting gear ratio is assigned) to be configured as starting clutches.

It is likewise advantageous overall for one of the two sub-transmissions to comprise odd-numbered gear ratios and for the other of the two sub-transmissions to comprise even-numbered gear ratios.

In this embodiment, gear changes can be completed as in the case of a dual-clutch transmission. During driving via one of the two sub-transmissions, a following gear ratio can be preselected in the other sub-transmission and gear changes can take place through overlapping operation of the first and second friction clutches.

As a general rule, the drive train according to the invention is suitable for driving a driven motor vehicle axle, for a front-wheel or rear-wheel-drive vehicle, for example.

As a general rule it is also possible, however, for the drive train according to the invention to be configured as a four-wheel drive train.

It is possible in this case for the first and second drive shafts, which are rotatable independently of one another, to be connected to one another via a mechanical differential, the differential cage of which is connected to a longitudinal shaft, which is connected to a second driven axle.

In this embodiment, a differential is operated in a virtually reversed manner. The input shafts provided in a traditional mechanical differential distribute the driving power supplied via the differential cage to the drive shafts, but in the present embodiment, by contrast, they take up the driving power from the drive shafts and transmit it to the differential cage.

The notion of the differential cage should be understood in broad terms here and should relate not only to differential cages of bevel differential gears, but to any kind of mechanical differential (planetary differential, etc.), in which an input member and two output members are provided. The input member is referred to as the differential cage in the present case. In the present application, the output members are the input members or the axle drive to the second driven axle.

The second driven axle in this case may comprise a traditional mechanical differential for distributing the driving power between the driven wheels of the second driven axle or a dual-clutch differential.

It is likewise preferable overall for output members of the first and second friction clutches to be connected via a transmission step ratio to the drive shafts.

It is possible in this embodiment for the friction clutches to be compactly integrated into the transmission. In addition, it may be achieved through the transmission ratio that the friction clutches have a significantly lower torque load and, to this extent, can be made smaller in size.

According to a further overall preferred embodiment, the first and/or second friction clutches are identical in design.

The cost of the drive train can be reduced in this way, as a large number of identical parts can be used. For example, the input and output members of the friction clutches may each be identical in design. In addition, it is possible for two clutches to be combined in pairs in each case, wherein the activation system of these friction clutches combined in pairs acts in the same axle.

The friction clutches may be configured as wet-running friction clutches, particularly as wet-running multi-plate clutches. It is also conceivable, however, as a general rule for the friction clutches to be configured as dry clutches.

Depending on the embodiment, the following advantages can be achieved with the drive train according to the invention or with the method according to the invention.

As a general rule, the additional expenditure can be kept as low as possible through the use of symmetries and a high proportion of identical parts.

The torque vectoring function enables corners to be taken in a particularly sporty manner.

The friction clutches can preferably all be activated independently of one another. The multi-step transmission of the drive train does not require a hollow shaft structure.

The clutches may each be identical in structure. In addition, the activator mechanisms used to activate the clutches may also be identical in structure.

Since the clutches can be combined locally, shared cooling oil management is possible. It is particularly possible for the cooling oil used for the friction clutches (in the case of wet-running friction clutches) to be provided in a single housing. A costly division of lubricating fluid for the transmission and cooling fluid for the friction clutches can thereby be dispensed with.

The possibility of driving both driven wheels on a driven axle with different transmissions means that further wheel sets can be dispensed with, as are provided, for example, in the state of the art according to the document DE 39 00 638 C2.

Since the friction clutches can preferably be arranged on the output side of the transmission, simpler heat removal results. This applies particularly since the friction clutches are not arranged in the immediate vicinity of a prime mover such as an internal combustion engine, as in the case of traditional dual-clutch transmissions.

As a general rule, greater design freedom results for the clutch activator mechanisms, since the ends of intermediate shafts of the multi-step transmission, for example, are usually freely accessible.

The electric and hydraulic functions can be integrated in a control unit or in a mechatronic module (only one SIL 3 system).

As described above, each driven wheel of the driven axis can therefore be driven overall at any time (except for during gear changing) in selectable proportions with each available sub-transmission. This facilitates the functionality of the drive train in document DE 39 00 638 C2, without additional transmission ratios having to be provided. In addition, a functionality can also be represented, as illustrated in document DE 10 2004 046 008 A1. In other words, the torque vectoring function can be carried out in a speed-guided (second kind) or torque-guided (first kind) manner. In addition, the functionality of an electronically controllable differential lock for the driven axle can also be achieved.

A traditional, mechanical differential is not necessary for the driven axle of the drive train according to the invention.

The drive shafts are therefore generally rotatable independently of one another and are not mechanically connected to one another (unless the four-wheel functionality described above is realized).

It is clear that the aforementioned features, which are still to be explained below, can not only be used in the combination indicated, but also in other combinations or can be used in isolation, without departing from the scope of the present invention.

BRIEF DESCRIPTION OF THE SEVERAL VIEWS OF THE DRAWINGS

Exemplary embodiments of the invention are represented in the drawing and explained in greater detail in the following description. In the figures:

FIG. 3 shows a schematic sectional view through a further embodiment of a drive train according to the invention;

FIG. 3a shows an optional addition for the drive trains in FIG. 2 or 3;

FIG. 4 shows a longitudinal sectional view through a further embodiment of a drive train according to the invention, in which four-wheel drive functionality is realized in addition;

FIG. 5 shows a schematic sectional view through a further embodiment of a drive train according to the invention, in which four-wheel drive functionality is achieved;

FIG. 6 shows a schematic sectional view through a further embodiment of a drive train according to the invention, in which a prime mover is formed by an electric motor; and FIG. 7 shows a modified embodiment of the drive train in FIG. 6, wherein an internal combustion engine can be connected up in addition to perform a range extender function.

DETAILED DESCRIPTION OF THE INVENTION

Figure 1:
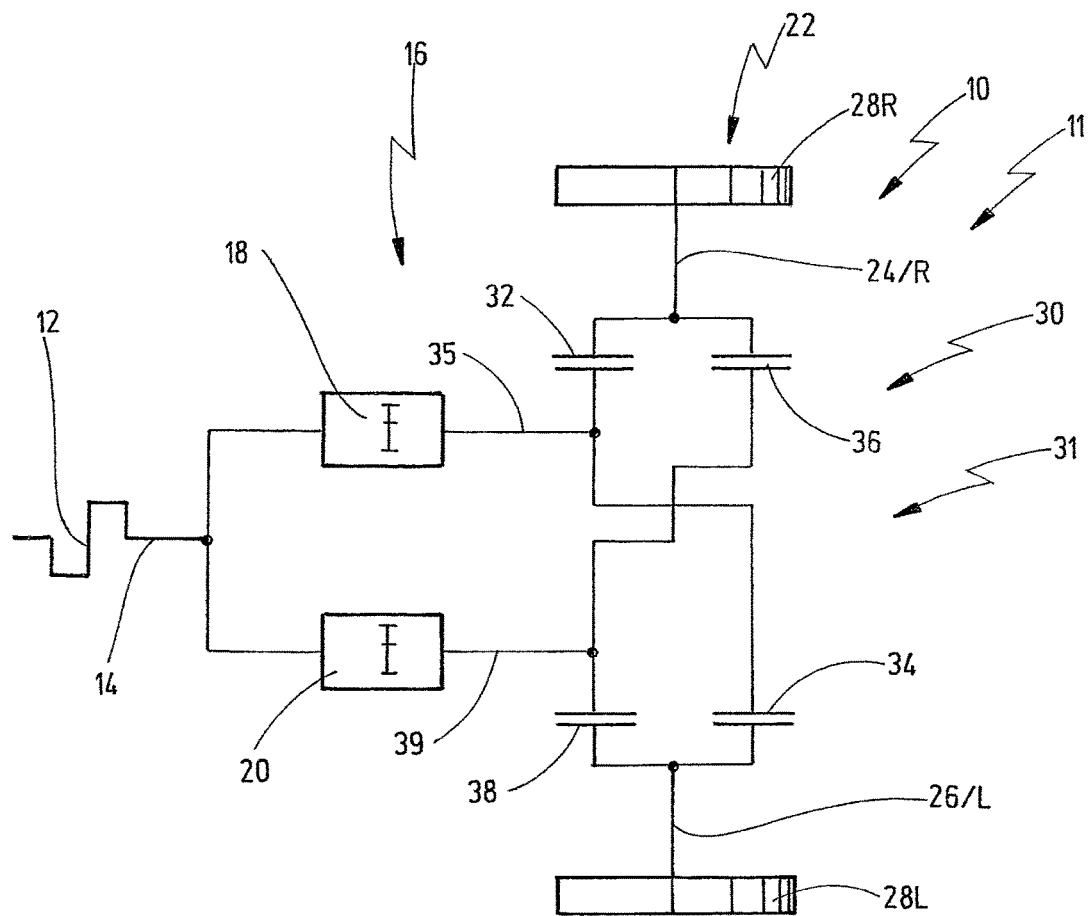
FIG. 1 shows a schematic representation of an embodiment of a drive train according to the invention.

A first embodiment of a drive train according to the invention is represented in schematic form in FIG. 1 and generally labeled as 10.

The drive train 10 is used to drive a schematically depicted motor vehicle 11 and comprises a prime mover in the form of an internal combustion engine 12. The internal combustion engine 12 is connected straight to a single transmission input shaft 14 of a multi-step transmission 16. The multi-step transmission 16 comprises a first sub-transmission 18 and a second sub-transmission 20. The first sub-transmission 18 preferably contains odd-numbered gear ratios. The second sub-transmission 20 preferably contains even-numbered gear ratios. A reverse gear ratio may be arranged on the first or on the second sub-transmission 18, 20.

The drive train 10 further contains a driven axle 22, having a first drive shaft 24, R, which is connected to a first driven wheel 28R, and having a second drive shaft 26, L, which is connected to a second driven wheel 28L.

A clutch arrangement 30 is arranged between the drive shafts 24, 26 and the multi-step transmission 16, said clutch arrangement acting as a power-splitting mechanism, in order to distribute driving power supplied via the multi-step transmission 16 to the first and second drive shaft 24, 26.

The clutch arrangement 30 contains a first friction clutch 32, the input member of which is connected to an output 35 of the first sub-transmission 18. In addition, the clutch arrangement 30 comprises a further first friction clutch 34, the input member of which is connected to the output 35 of the first sub-transmission 18. The clutch arrangement 30 further exhibits a second friction clutch 36, the input member of which is connected to an output 39 of the second sub-transmission 20, and also a further second friction clutch 38, the input member of which is connected to the output 39 of the second sub-transmission 20.

The output members of the first friction clutch 32 assigned to the first sub-transmission 18 and also those of the second friction clutch 36 assigned to the second sub-transmission 20 are rigidly connected to the first drive shaft 24. In a corresponding manner, an output member of the further first friction clutch 34 and an output member of the further second friction clutch 38 are rigidly connected to the second drive shaft 26.

Driving power generated by the prime mover 12 can then be transmitted using any ratio of the first sub-transmission 18 to the left or right driven wheel 28L, 28R. Parallel to this or independently thereof, the driving power may be supplied by the prime mover 12 via the second sub-transmission 20 to the left or right driven wheel 28L, 28R.

The four friction clutches 32, 34, 36, 38 which form the clutch arrangement 30 can be activated independently of one another.

During normal driving, a gear ratio is set up in one of the two sub-transmissions (for example, sub-transmission 18) and the friction clutches (in this case 32, 34) assigned to the first sub-transmission are engaged in order to distribute the driving power between the two driven wheels 28L, 28R. When cornering, the friction clutch assigned to the inside wheel can, for example, be activated with a smaller torque in this case, in order to achieve a dual-clutch differential function and/or torque vectoring.

In order to carry out a gear change, the two first friction clutches 32, 34 are disengaged and the two second friction clutches 36, 38 are engaged in a manner overlapping therewith, wherein in the second sub-transmission 20 a target gear ratio is preselected. In this way, a gear change can take place from a source gear ratio of the first sub-transmission 18 to a target gear ratio of the second sub-transmission 20 without any loss of tractive force. In a corresponding manner, a gear change can be made from the second sub-transmission 20 to the first sub-transmission 18.

It is possible, moreover, for the inside wheel to be driven using a low ratio and the outside wheel to be driven using a higher ratio during cornering, so that the outside wheel turns more quickly. In other words, the inside wheel may, for example, be driven via the first sub-transmission 18 and the first friction clutch 32, and the outside wheel may be driven, for example, via the second sub-transmission 20 (using a higher gear ratio than in the first sub-transmission) and the second friction clutch 38 (in this case the other first friction clutch 34 and the other second friction clutch 36 are open).

All friction clutches may be disengaged or engaged or they may be set at a given torque, for which they are activated in the slipping state.

In the following FIGS. 2 to 5, further embodiments of drive trains are illustrated, which correspond to the drive train 10 in FIG. 1 in terms of design and function. The same elements are therefore labeled using the same reference numbers. The principle differences are explained below.

Figure 2:
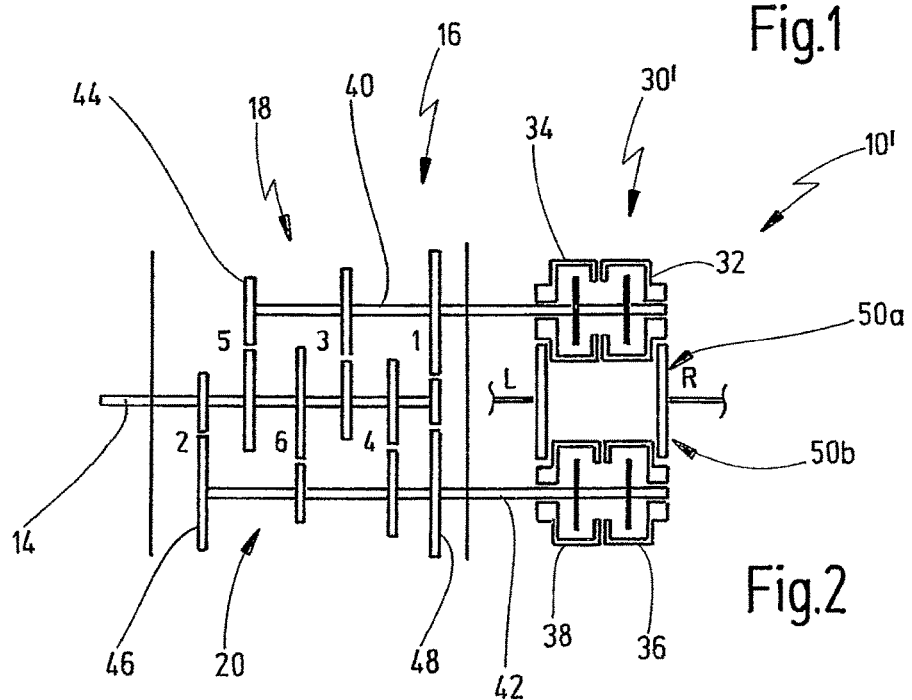
FIG. 2 shows a schematic sectional view through a further embodiment of a drive train according to the invention.

In the case of the drive train 10' in FIG. 2, the multi-step transmission 16 comprises a first intermediate shaft 40 for the first sub-transmission 18 and a second intermediate shaft 42 for the second sub-transmission 20. The first sub-transmission 18 comprises gear ratios 1, 3, 5, which are formed by wheel sets, which connect the transmission input shaft 14 and the first intermediate shaft 40 to one another. The second sub-transmission 20 comprises gear ratios 2, 4, 6, which are formed by wheel sets, which connect the transmission input shaft 14 and the second intermediate shaft 42 to one another.

It is clear that in order to shift the wheel sets in a manner known per se, shifting clutches are provided, which may be configured as synchronous self-shifting clutches, for example, and are preferably arranged on the intermediate shafts 40, 42 (in this case, the wheels arranged on the intermediate shafts are designed as loose wheels and the wheels arranged on the transmission input shaft 14 are designed as fixed wheels).

The wheel sets of the first sub-transmission 18 are jointly referred to as 44. The wheel sets of the second sub-transmission 20 are jointly referred to as 46.

The first intermediate shaft 40 is connected to a dual-clutch package 30'. To be more precise, the first intermediate shaft 40 is connected to input members of the two first friction clutches 32, 34, which are arranged coaxially to the first intermediate shaft 40. In a corresponding way, the second two friction clutches 36, 38 are arranged coaxially to the second intermediate shaft 42 and input members of these second two friction clutches 36, 38 are connected to the second intermediate shaft 42.

Output members of the two first friction clutches 32, 34 are connected via a first transmission ratio 50a to the left or right drive shaft L, R. In a corresponding way, output members of the two second friction clutches 36, 38 are connected via a second transmission ratio 50b to the left or right drive shaft L, R.

Gear ratio 1 is provided as the starting gear ratio. In order to reduce the load of the first friction clutches 32, 34, an additional wheel set is provided in the second sub-transmission 20, namely in the form of an additional wheel set 48, which sets up the same ratio as gear ratio 1 in the first sub-transmission 18.

In this embodiment, starting can take place by activating all four clutches 32, 34, 36, 38, so that the load for the individual clutch is significantly reduced.

The drive train 10" shown in FIG. 3 generally corresponds to the drive train in FIG. 2 in terms of design and function. The principle differences are explained below.

While the clutch arrangement 30' in the drive train 10' in FIG. 2 is arranged on the side of the transmission 16 facing away from the prime mover 12, the clutch arrangement 30" in FIG. 3 is arranged in the region of the input side of the transmission 16.

It can further be recognized that the additional wheel set 48 comprises a separate fixed wheel 52 in the embodiment in FIG. 3. While in the case of the embodiment in FIG. 2 only one single fixed wheel is provided on the transmission input shaft 14 for the gear ratio 1, said single fixed wheel being engaged with a loose wheel of the first sub-transmission 18 and with the additional loose wheel 48 in the second sub-transmission 20, in the embodiment in FIG. 3 a separate fixed wheel 52 is provided for the additional wheel set 48. Different axle distances can thereby be balanced, in order to set up the same transmission for the starting gear ratio 1 on the intermediate shafts 40, 42.

In addition, FIG. 3a shows that the drive trains can be combined with an electric motor 54, in order to set up hybrid functionality. In this case, the electric motor 54 may be generally connected to the transmission input shaft 14. As shown, however, the electric motor 54 is preferably connectable via a shifting clutch arrangement 56 to the first intermediate shaft 40 or alternatively to the second intermediate shaft 42. In addition, a transmission ratio 58 is set up between the electric motor 54 and the first intermediate shaft 40 and a further transmission ratio 60 is set up between the electric motor 54 and the second intermediate shaft 42.

The electric motor 40 may also be used to form a torque support during gear changes in low gear ratios.

In this way, the load for the friction clutches can be further reduced.

The arrangement shown in FIG. 3a can be combined both with the drive train 10' in FIG. 2 and also with the drive train 10" in FIG. 3 and likewise with the drive train 10''' in FIG. 4.

The drive train 10''' in FIG. 4 generally corresponds to the drive train 10' in FIG. 2 in terms of its design and function. However, the first friction clutches 32, 34, which are assigned to the first sub-transmission 18, are connected to the first intermediate shaft 40 at axially opposite ends of the transmission 16. The second two friction clutches 36, 38 are connected in a corresponding manner to the second intermediate shaft 42 at axially opposite ends of the transmission 16. In this embodiment, the first friction clutch 32 and the second friction clutch 36, which are assigned to the right drive shaft R, form a clutch package. The first friction clutch 34 and the second friction clutch 38 form a second clutch package axially spaced therefrom, said clutch package being assigned to the second drive shaft L.

The drive shafts L, R are generally rotatable independently of one another in the embodiments described above.

However, a variant is shown in FIG. 4, in which the drive shafts L, R are connected to one another via a mechanical differential 65, in order to form an axle drive 64 for a further driven axle (not depicted). To be more precise, the drive shafts 24, 26 are connected to side wheels of the differential 65, whereas the differential cage 66 is connected to a longitudinal shaft 68, which is connected to the second driven axle. The mechanical differential is therefore operated in reverse like a traditional mechanical differential.

A further drive train $10^{IV}$ is shown in FIG. 5, which corresponds to the drive train 10" in FIG. 3. In this case, four-wheel functionality is set up in addition, in that the left and right drive shafts L, R are connected to one another via a differential 65, the differential cage 66 whereof being connected to a longitudinal shaft 68, so that the same functionality results as in the embodiment in FIG. 4.

Further embodiments of drive trains according to the invention are shown in FIGS. 6 and 7. These generally correspond to the drive train 10 in FIG. 1 in terms of design and functionality. However, instead of an internal combustion engine, an electric motor 70 is provided as the prime mover.

The electric motor 70 is connected to a single transmission input shaft 14, namely directly, without the interposition of a clutch.

On the transmission input shaft 14 two fixed wheels are appointed for a first gear ratio 1, as well as two fixed wheels for a gear ratio 2. In the present case, the drive train $10^V$ in FIG. 6 is designed as the drive train for an electric vehicle, wherein the multi-step transmission only comprises two gear ratios.

In order to achieve the functionality described above, the wheel sets for the gear ratios are doubled in this case, wherein the four friction clutches 32, 34, 36, 38 are all arranged coaxially to the drive shafts L, R. The loose wheels engaged with the fixed wheels for the gear ratios 1 and 2 in this case are likewise rotatably mounted on the left or right drive shaft L, R.

In the present case, the friction clutches are also used as shifting clutches for engaging and disengaging the gear ratios.

A modification of the embodiment shown in FIG. 6, namely in the form of a drive train $10^{VI}$, is shown in FIG. 7.

In this embodiment, the four friction clutches 32, 34, 36, 38, which are arranged coaxially to the loose wheels, said loose wheels being engaged with the fixed wheels for the gear ratios 1 and 2, are arranged coaxially to one another, but on an axis 71 which runs parallel to the drive shafts L, R. More precisely, the first friction clutch 32 and the second friction clutch 36 are arranged on a first intermediate shaft 80, which is connected to the right drive shaft 24, R via a first transmission ratio 50a. In a corresponding manner, the further first friction clutch 34 and the further second friction clutch 38 are arranged on a second intermediate shaft 82, which is connected to the left drive shaft 26, L via a further transmission ratio 50b.

In this embodiment, the friction clutches may each be smaller in size, since they are exposed to smaller torques. As in FIG. 6, the second gear ratio is shifted using the separating clutches 38 and 36 and the first gear ratio using the separating clutches 32 and 34.

In the embodiments in FIGS. 6 and 7, the drive trains $10^V$, $10^{VI}$ are generally designed for electric vehicles. In both cases, the drive trains may, however, also be designed as range extender drive trains. In this case, an internal combustion engine 72 may be provided, which can be connected to the transmission input shaft 14 via a shifting clutch arrangement 74. In the present case, an engine shaft 75 of the internal combustion engine 72 is connected to a generator 78, and the engine shaft 75 may be connected via the shifting clutch arrangement 74 and, where appropriate, a transmission ratio 76 to the transmission input shaft 14. An optionally provided generator which can be connected to the internal combustion engine 72 is shown with 78. During normal driving, a battery of the drive train, which is not shown, is charged up by running the internal combustion engine 72 so that the generator 78 produces electrical power. The electrical power may be taken by the electric motor 70 to drive the motor vehicle. In addition, it is possible to drive the vehicle simply by means of the internal combustion engine 72, for which purpose the shifting clutch arrangement 74 is engaged. In this case, however, the electrical motor 70 and the generator 78 must be carried along, insofar as no separating clutches are provided. When the friction clutches 32, 34, 36, 38 are disengaged, the internal combustion engine 72 may be started by means of the electric motor 70, for which purpose the shifting clutch arrangement 74 is likewise engaged.

What is claimed is:

1. A drive train for a motor vehicle, having a drive unit which comprises a prime mover, a multi-step transmission which comprises a transmission input and a first sub-transmission and a second sub-transmission, and having a power-splitting device which distributes the driving power between a first and a second drive shaft of a driven axle, wherein the prime mover is directly connected to the transmission input, wherein each of the two drive shafts is assigned a first and a second friction clutch, wherein the first friction clutches connect the respective drive shaft to the first sub-transmission and wherein the second friction clutches connect the respective drive shaft to the second sub-transmission, such that the first friction clutches and the second friction clutches form the power-splitting device.

2. The drive train as claimed in claim 1, wherein the prime mover comprises an internal combustion engine.

3. The drive train as claimed in claim 1, wherein the first sub-transmission comprises a first intermediate shaft, wherein gear ratios of the first sub-transmission are formed by wheel sets, which connect a transmission input shaft to the first intermediate shaft.

4. The drive train as claimed in claim 3, wherein the second sub-transmission comprises a second intermediate shaft, wherein gear ratios of the second sub-transmission are formed by wheel sets, which connect the transmission input shaft to the second intermediate shaft.

5. The drive train as claimed in claim 1, wherein the first friction clutches are arranged coaxially to a shaft of the first sub-transmission.

6. The drive train as claimed in claim 1, wherein the second friction clutches are arranged coaxially to a shaft of the second sub-transmission.

7. The drive train as claimed in claim 1, wherein the drive unit comprises an electric motor for supplying driving power, which can be connected to at least one of the sub-transmissions by means of a shifting clutch arrangement.

8. The drive train as claimed in claim 1, wherein the prime mover comprises an electric motor.

9. The drive train as claimed in claim 8, wherein the first sub-transmission comprises a single first gear ratio and/or wherein the second sub-transmission comprises a single second gear ratio.

10. The drive train as claimed in claim 9, wherein the multi-step transmission comprises a single transmission input shaft, on which two fixed wheels for the first gear ratio are fixed, which the two fixed wheel engage with loose wheels, which loose wheels can be shifted by means of the first friction clutches in the power flow, and on which the single transmission input shaft having two further fixed wheels for the second gear ratio are fixed, said further fixed wheels engaging with loose wheels, which can be shifted by means of the second friction clutches in the power flow, in order to distribute the driving power between the two drive shafts.

11. The drive train according to claim 8, wherein the drive unit comprises an internal combustion engine connected to the transmission input by means of a shifting clutch arrangement.

12. The drive train as claimed in claim 1, wherein the transmission input comprises a single transmission input shaft.

13. The drive train as claimed in claim 1, wherein both sub-transmissions comprise a starting gear ratio with the same transmission ratio, such that starting can take place by means of the two first and by means of the two second friction clutches.

14. The drive train as claimed in claim 1, wherein the first and second friction clutch of at least one of the first and the second drive shaft are arranged coaxially to the first and/or the second drive shaft.

15. The drive train as claimed in claim 1, wherein at least one of the first and the second friction clutches are configured as starting clutches.

16. The drive train as claimed in claim 1, wherein one of the two sub-transmissions comprises odd-numbered gear ratios and the other of the two sub-transmissions comprises even-numbered gear ratios.

17. The drive train as claimed in claim 1, wherein the first and the second drive shaft are connected to one another via a mechanical differential, the differential cage of which is connected to a longitudinal shaft, which is connected to a second driven axle.

18. The drive train as claimed in claim 1, wherein output members of the first and second friction clutches are connected via a transmission step to the drive shafts.

19. The drive train as claimed in one of the claim 1, wherein at least one of the first and the second friction clutches are identical in design.

* * * * *